United States Patent [19]

Kakizaki

[11] Patent Number: 4,866,760

[45] Date of Patent: Sep. 12, 1989

[54] AUTO DIALLING FACSIMILE APPARATUS

[75] Inventor: Jun Kakizaki, Tokyo, Japan

[73] Assignee: NEC Corporation, Japan

[21] Appl. No.: 111,620

[22] Filed: Oct. 21, 1987

[30] Foreign Application Priority Data

Oct. 31, 1986 [JP] Japan .............................. 61-260132

[51] Int. Cl.⁴ ......................................... H04M 11/00
[52] U.S. Cl. .................................................. 379/100
[58] Field of Search .................... 379/93, 94, 95, 100; 358/280

[56] References Cited

U.S. PATENT DOCUMENTS 4,654,718 3/1987 Sueyoshi ............................. 379/100
4,764,951 8/1988 Kotani et al. ....................... 379/100

FOREIGN PATENT DOCUMENTS 2161343 1/1986 United Kingdom ................ 379/100

Primary Examiner—Gerald Brigance
Assistant Examiner—Richard Hjerpe
Attorney, Agent, or Firm—Laff, Whitesel, Conte & Saret

[57] ABSTRACT

In an auto dialling facsimile apparatus, data representative of telephone numbers of specified destinations are stored in a first memory and data representative of access time intervals are stored in a second memory corresponding respectively to the specified destinations. The stored data are retrieved from the first and second memory in response to the entry of a called station unique code supplied from a keyboard. Telephone switching signal is transmitted to a switched telecommunication network in accordance with data retrieved from the first memory to establish a connection through the network. The length of time elapsed from the time said dialling signal is transmitted is measured, the measured time length being reset when an answer signal is returned from the desired destination. The switched connection is released when the measured time length exceeds the access time interval represented by the data retrieved from the second memory.

2 Claims, 1 Drawing Sheet

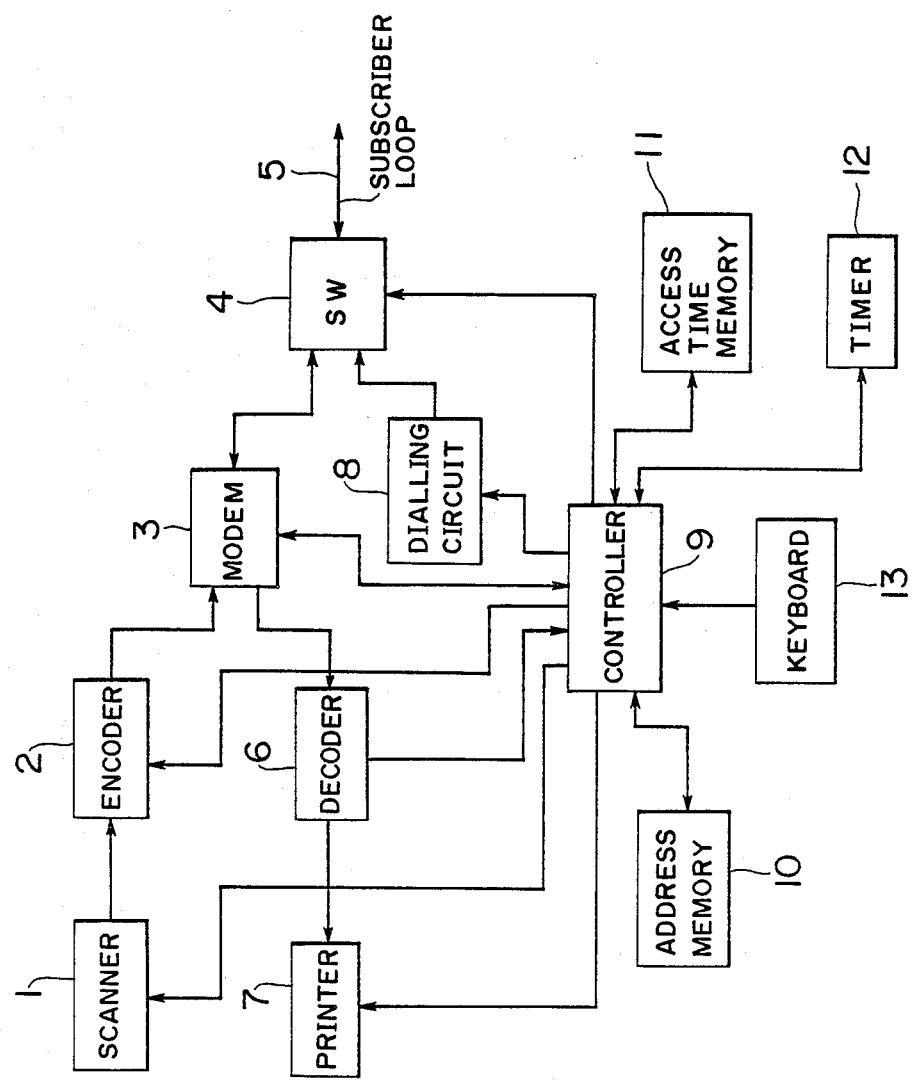

4,866,760

AUTO DIALLING FACSIMILE APPARATUS

BACKGROUND OF THE INVENTION

The present invention relates to a facsimile apparatus having an automatic dialling feature.

With a conventional facsimile apparatus which uses an auto dialling circuit for establishing a facsimile call through a telephone network in response to manual entry of an abbreviated called station number or operation of a specified key, a timer is provided to measure the amount of time elapsed from the time of completion of the facsimile call and time out if it exceeds a preset value before the called station answers, allowing the calling station to regard that the called station is busy.

As a result, it is necessary for the prior art auto dialling facsimile apparatus to preset the timer in accordance with an access time taken to establish a connection to the farthest of the registered destinations.

Since the call establishment time usually varies with the distance to destination, the preset value is greater than is necessary for calls to short distance destinations and therefore the apparatus unnecessarily holds switched connections to short distance destinations for a long period of time.

SUMMARY OF THE INVENTION

It is therefore an object of the present invention to provide an auto dialling facsimile apparatus which holds the switched connection for a length of time which is uniquely determined by the destination.

This object is obtained by storing access time data in a memory uniquely corresponding to specified destinations and releasing a switched connection to a desired destination if the amount of time elapsed from the establishment of the connection exceeds the access time uniquely associated with the called station.

In accordance with the present invention, data representative of telephone numbers of specified destinations are stored in a first memory and data representative of access time intervals are stored in a second memory corresponding respectively to the specified destinations. The stored data are retrieved from the first and second memory in response to the entry of an abbreviated dialing number of a called station or operation of a key uniquely associated with the called station. Telephone switching signal is transmitted to the telephone line in response to data retrieved from the first memory to establish a switched connection to the desired destination. The length of time elapsed from the time said dialling signal is transmitted is measured, the measured time length being reset when a valid signal is transmitted from the destination. The switched connection is released when the measured time length exceeds a value determined by the access time data retrieved from the second memory.

BRIEF DESCRIPTION OF THE DRAWINGS

The present invention will be described in further detail with reference to the accompanying sole drawing, in which a block diagram of an auto dialling facsimile apparatus of the present invention is shown.

DETAILED DESCRIPTION

Referring to the drawing, there is shown an auto dialling facsimile apparatus according to the present invention. The apparatus comprises a scanner 1 for reading a document to be transmitted and generating a facsimile message in analog form. The analog message signal is digitized by an encoder 2 if required and modulated upon a carrier by a modem 3 and fed to one input of a switch 4, the output of which is coupled through a subscriber loop 5 to an end office of a general switched telephone network. Modem 3 provides demodulation of a received signal. A decoder 6 is connected to the modem 3 for decoding the demodulated signal if it is in digital form and applying the decoded signal to a printer 7. A dialling circuit 8 is connected to second input of the switch 4 for automatically performing a call establishment procedure (termed phase A according to the CCITT Recommendation T.30) to set up a facsimile call to a desired station.

A controller 9 is provided for controlling all the above-mentioned units. Controller 9 is further associated with a destination address memory 10, an access time memory 11 and a timer 12. A keyboard 13 is also connected to the controller 9 for entry of destination address data, or telephone numbers of specified destinations into address memory 10 and for entry of access time data into time memory 11. The address data of a specified destination is read out of the memory 10 when an abbreviated dialling number of the called station is entered or a key uniquely assigned to it is operated on the keyboard 13. The access time data defines the amount of time necessary to establish a facsimile call to each of the specified destinations. The access time $T_0$ of each of the specified destinations is determined by the average of the access time intervals which vary between different destinations depending on the domestic and international network parameters. The access time data $T_0$ is registered into memory 11 in a storage location addressable as a function of an input signal such as the abbreviated dialling number of a desired destination or as a function of the called station unique key and is read out of the memory 11 when such input signal is entered during call establishment phase. Controller 9 arithmetically sums the access time read out of the memory 11 with a time-out $T_1$ which defines the amount of time two stations will continue to attempt to identify each other. According to the CCITT Recommendation T.30, $T_I$ is set equal to 35 ± 5 seconds, begins upon entering phase B, and is reset upon detecting a valid signal or when $T_I$ times out. The total time period of $T_0 + T_I$ is preset into the timer 12. Timer 12 is triggered in response to the dialling circuit 8 completing the transmission of the address signal of a destination station to the telephone network in accordance with a destination address read out of the address memory 10. Timer 12 measures the length of time elapsed from the time it is triggered immediately following the completion of the dialling procedure and generates an absence-of-answer signal when the elapsed time exceeds the preset value before the calling station receives a called station identification (CED) upon entering phase B.

In operation, the abbreviated dialling number of a desired station is manually entered or a unique key of the called station is operated, with a document being set in the apparatus. Controller 9 reads a corresponding destination address out of the address memory 10 into dialling circuit 8, controls the switch 4 to connect the output of the dialling circuit 8 to the subscriber loop 5 and causes the dialling circuit 8 to initiate dialling. When the last digit of the dialled information is sent, the controller 9 directs the switch 4 to connect the modem 3 to the subscriber loop 5 to make the apparatus ready to receive a CED. Controller 9 then addresses the access time memory 11 to read the corresponding access time data and sums it with the time-out period $T_l$ and presets the sum into the timer 12. The called station will receive ringing signals if the line is idle to close its loop. After presetting the timer 12, the controller 9 monitors an output of the modem 3 to detect a CED and a digital identification signal (DIS) which are transmitted in succession in response to the called station closing the loop. On receipt of the digital identification signal, the controller 9 resets the timer 12. If the called station is not idle, no CED and DIS are received and $T_l$ times out, resetting the timer 12.

It is seen that the telephone connection is not held for an unnecessarily long period of time for receiving an answer signal from short distance destinations.

What is claimed is:

1. A method of establishing a facsimile call to a desired destination, comprising the steps of:
    (a) storing signals in an address memory which are representative of access numbers identifying a plurality of destinations;
    (b) storing signals in an access time memory which are representative of a plurality of distinct access time lengths, wherein each access time length directly corresponds to a particular destination identified by one of said access numbers;
    (c) retrieving one of said signals from said address memory and retrieving one of said signals from said access time memory corresponding to the signal retrieved from said address memory in accordance with a desired one of said destinations;
    (d) transmitting a switch controlling signal to a telecommunication switching network in response to the signal retrieved from said address memory in order to establish a connection to said desired destination;
    (e) measuring an elapse of a length of time which begins at the time when said switch controlling signal is transmitted to said network; and
    (f) resetting the measured time length if an answer signal is returned from said desired destination before said measured time length exceeds the access time length represented by the signal retrieved from said access time memory and clearing said connection if said measured time length exceeds said access time length.

2. A facsimile apparatus comprising:
    an address memory means for storing signals representative of access numbers identifying a plurality of destinations;
    an access time memory means for storing signals representative of a plurality of distinct access time lengths, wherein each access time length directly corresponds to a particular destination identified by one of said access numbers;
    manual entry means for retrieving one of said signals from said address memory means and for retrieving one of said signals from said access time memory means corresponding to the signal retrieved from said address memory means in accordance with a desired one of said destinations;
    means for transmitting a switch controlling signal to a telecommunication switching network in response to the signal retrieved from said address memory means in order to establish a connection to said desired destination; and
    means for measuring the length of a time period beginning at the time when said switch controlling signal is transmitted to said network, and for resetting the measured time period if an answer signal is returned from said desired destination before said measured time period exceeds the access time length represented by the signal retrieved from said access time memory or for clearing said connection if said measured time period exceeds said access time length.

* * * * *